United States Patent
Mehringer (10) Patent No.: US 9,276,497 B2
(45) Date of Patent: Mar. 1, 2016

(54) METHOD FOR OPERATING A POWER CONVERTER, AND POWER CONVERTER CONTROL UNIT

(71) Applicant: Paul Mehringer, Stuttgart (DE)

(72) Inventor: Paul Mehringer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 174 days.

(21) Appl. No.: 13/899,084

(22) Filed: May 21, 2013

(65) Prior Publication Data

US 2013/0307461 A1    Nov. 21, 2013

(30) Foreign Application Priority Data

May 21, 2012    (DE) .......................... 10 2012 208 458

(51) Int. Cl.

| H02P 6/00 | (2006.01) |
| H02M 7/219 | (2006.01) |
| H02M 1/38 | (2007.01) |
| H02M 7/797 | (2006.01) |

(52) U.S. Cl.
CPC ................ *H02M 7/219* (2013.01); *H02M 1/38* (2013.01); *H02M 7/797* (2013.01)

(58) Field of Classification Search
USPC .................. 318/400.01, 606, 400.26, 400.27, 318/400.28, 400.29, 700, 701, 721, 727, 318/799, 800, 801; 388/800, 806, 815, 819
See application file for complete search history.

(56) References Cited

U.S. PATENT DOCUMENTS

| 4,674,023 | A | * | 6/1987 | Peppel et al. ................... 363/57 |
| 6,121,736 | A | * | 9/2000 | Narazaki et al. ......... 318/400.35 |
| 7,379,282 | B1 | * | 5/2008 | Zansky ............................. 361/82 |
| 8,288,979 | B2 | * | 10/2012 | Bates et al. .................... 318/432 |
| 8,847,575 | B2 | * | 9/2014 | Koeppl et al. .............. 324/76.11 |
| 2011/0018521 | A1 | * | 1/2011 | Jonsson et al. ................ 323/311 |
| 2012/0218800 | A1 | * | 8/2012 | Jimichi et al. ................ 363/131 |
| 2013/0127441 | A1 | * | 5/2013 | Tseng et al. ............... 324/76.11 |

FOREIGN PATENT DOCUMENTS

DE    102 00 332    7/2002

* cited by examiner

*Primary Examiner* — Antony M Paul
(74) *Attorney, Agent, or Firm* — Kenyon & Kenyon LLP (57) ABSTRACT

A method for operating a power converter having at least one power converter half-bridge, in which a controllable switching element and a freewheeling diode connected parallel thereto and in the blocking direction are provided respectively between a first direct voltage terminal and an alternating voltage terminal as well as between the alternating voltage terminal and a second direct voltage terminal. The switching elements of the at least one half-bridge are controlled in alternating fashion and in each case interrupted by controlling pauses. The duration of the controlling pauses is set on the basis of a determined voltage drop at at least one of the freewheeling diodes.

14 Claims, 5 Drawing Sheets

METHOD FOR OPERATING A POWER CONVERTER, AND POWER CONVERTER CONTROL UNIT

FIELD OF THE INVENTION

The present invention relates to a method for operating a power converter, and to a power converter control unit for carrying out the method.

BACKGROUND INFORMATION

Electric machines, such as synchronous machines, can be operated in generator operation or in motor operation, together with active power converter circuits, fashioned for example as a bridge circuit. Such a bridge circuit is shown schematically in FIG. 1, explained below. Such power converters standardly have a number of half-bridges each having two controllable switching elements, and can be used for the rectification of an alternating or three-phase current produced by a generator, and/or for inversion during the commutation of an electric motor. A so-called freewheeling diode is standardly provided parallel to each switching element. The blocking direction of the freewheeling diode corresponds to the technical direction of current between the direct voltage terminals. The named switching elements can for example be fashioned as metal oxide semiconductor field-effect transistors (MOSFET). In a corresponding MOSFET, the freewheeling diode is realized as an inverse diode.

Both in rectification operation and in inversion operation (for motoric operation of the electric machine), the switching elements of a power converter half-bridge are each controlled in alternating fashion, i.e. are switched into a conductive state. Here the switching elements react with a certain switching delay that is a function of many influencing factors, such as parasitic inductances, component tolerances, and the actual level of the current at the direct voltage terminal.

During switching, a so-called "hot path," i.e. a simultaneous conductive state of both the switching elements, should be avoided in order to prevent a short circuit. In order to take into account the switching delays during operation, a so-called dead time can be provided between the control phases for the switching elements of a power converter half-bridge. This is a pause during which neither of the two switching elements of a power converter half-bridge are controlled. The switching elements of a power converter half-bridge are thus controlled in alternating fashion, each interrupted by controlling pauses.

The dead time must be chosen to be long enough to ensure that no one switching element of the half-bridge has opened before the other switching element of the half-bridge closes. On the other hand, the dead time must be kept as short as possible in order to avoid losses at the freewheeling diodes that occur as long as both switching elements are open. Therefore, the present invention seeks to improve the setting of the dead time in the controlling of power converters, in particular in inversion operation, and to enable more reliable operation.

SUMMARY

The present invention enables a controlling strategy for optimizing the dead time between the alternating controlling of the switching elements of a power converter half-bridge of a power converter, in particular in inverting operation; the invention realizes a robust controlling with simple evaluating electronics, and is functional in variable operating states. In vehicle generators (in particular starter generators, which are also operated as motors, e.g. in order to start the internal combustion engine or for drive support, but also pure generators (so-called light machines)), the present invention has particular advantages because corresponding evaluating electronics are already implemented in modern motor vehicle bridge rectifiers, or can easily be implemented therein.

Through the proposed measures, excessive losses in the freewheeling diode that can occur due to conventional controlling can be reduced. At the same time, the occurrence of "hot paths" is reliably avoided. Through the method explained below, in each case a momentary optimum can be determined for the explained dead times, thus achieving the ideal compromise between the reduction of power loss and the prevention of a short circuit in the switching elements.

The dead times required in each case are influenced in particular by temperature influences, parasitic inductances, connection of an intermediate circuit, the switching speed of the switching elements, the momentary level of the phase current, and/or the voltage position of the supply voltage of a driver that is used. Because these parameters are also subject to component fluctuations as well as to external influences, the dead time is conventionally made large enough to be sufficient even in the worst case. The switching elements, or the freewheeling diodes allocated thereto, are therefore dimensioned so that they can dissipate the power losses that arise. This makes conventional systems more expensive. With the solution proposed according to the present invention, in contrast, a regulation of the dead time can be realized. Due to the high time demands, the regulation can for example be integrated in a corresponding driver.

As already explained, known power converter half-bridges each include controllable switching elements and so-called freewheeling diodes (e.g. in the form of inverse diodes) connected parallel thereto. The blocking direction of the diodes corresponds to the technical direction of current between the direct voltage terminals. Therefore, if a positive voltage signal is present at an alternating voltage terminal of a power converter half-bridge, an electric current flows between the alternating voltage terminal and a first direct voltage terminal, e.g. a positive battery pole B+. Here, the current flows either through a closed switching element or through the diode connected in parallel. Correspondingly, given the presence of a negative voltage signal at the alternating voltage terminal, a current flows between a second direct voltage terminal, e.g. a negative battery pole B−, or ground, and the alternating voltage terminal, here again either through a closed switching element or through the diode connected in parallel. In this way, an alternating voltage at the alternating voltage terminal can be rectified. This explanation holds in a corresponding manner for inversion in a power converter. It has been recognized that such an alternating voltage occurs not only in rectification operation, but also occurs in inversion operation due to the inductance of the electric machine, and can be used in the context of the present invention.

Given a flow of current via the switching element, due to the low-ohmic characteristic of the electrical connection produced thereby only a very low voltage, resulting from the forward resistance and the momentary current, is dropped over the switching element and the diode connected in parallel. When there is a flow of current via the diode, in contrast, a more significant voltage drop can be ascertained. The determination of a voltage drop over the diode can therefore be used to determine whether an active switching element allocated to a diode is open or closed. Therefore, if a voltage drop is detected over one of the diodes of a power converter half-bridge, it can be assumed that at least one of the active switching elements of a power converter half-bridge is open, and thus that a so-called "hot path," i.e. a continuous conductive connection between, e.g., a positive battery pole and ground, is not present.

The present invention makes use of this knowledge, and proposes that the duration of the above-explained controlling pauses be set taking into account a voltage drop at one of the freewheeling diodes. Preferably, the next switching element is controlled when the voltage drop exceeds a threshold value. The determination of the magnitude of the voltage drop can take place using a comparator and a comparator signal produced by the comparator. The comparator is allocated to a diode, and acquires the voltage drop over this diode. The voltage drop is compared to the threshold value. Preferably, a corresponding comparator is equipped with a predetermined hysteresis characteristic. Using a corresponding evaluation, it can be determined in each case when the corresponding current has been commutated into the inverse diode. As soon as this commutation has taken place, a controlling of the other switching element can take place without risking a cross-short-circuit in the form of a "hot path."

As long as the current runs via the inverse diode or an external freewheeling diode, due to the increased diode flux voltage there is an increased power loss in comparison to the activated state. This is relevant, inter alia, in circuits having SiC diodes, which have a higher forward voltage than do Si diodes. A comparator circuit, as is used for the evaluation of an active rectification and can be integrated into corresponding drivers, offers the possibility of carrying out, on the basis of this evaluation, a dynamic adaptation of the dead time, and thus a reduction of the switching losses. In this way, the present invention is economical and can easily be integrated into existing systems.

As can also be seen in particular from the following Figures, the evaluation of corresponding switching elements by comparator circuits, even in systems not having dedicated phase current evaluation, can enable inference of the direction of the current at the alternating voltage terminal of a respective power converter half-bridge (so-called phase current): given the presence of a positive half-wave at the alternating voltage terminal, a voltage is dropped at the freewheeling diodes at the positive battery pole, whereas given the presence of a negative half-wave a voltage at the freewheeling diode falls at the negative battery pole, or ground. In this way, it can be determined in which time window the zero transition of the phase current has taken place. This makes it possible to determine the phase position of the phase current reliably and inexpensively.

The present invention deploys its advantages in a range of power electronics in which inductive loads are present, such as power packs, rectifiers, pulse-controlled inverters, and the like.

A power converter control unit according to the present invention is set up, in particular in terms of programming, to carry out a method according to the present invention. A power converter system having a power converter and such a power converter control unit, as well as a motor vehicle generator having such a power converter system, also form the subject matter of the present invention.

The implementation of the control method for the switching elements in the form of software is also advantageous because it results in particularly low costs, in particular when an existing control device is used for further tasks and is therefore already present. Suitable data carriers for providing the computer program having a program code include in particular diskettes, hard drives, flash memory devices, EEPROMs, CD-ROMs, DVDs, and others. It is also possible to download a program via computer networks (Internet, intranet, etc.).

Further advantages and embodiments of the present invention result from the description and the accompanying drawing.

Of course, the features named above and explained in the following may be used not only in the respectively indicated combination, but also in other combinations or alone without departing from the scope of the present invention.

The present invention is shown schematically in the drawing on the basis of an exemplary embodiment, and is described in detail in the following with reference to the drawing.

DETAILED DESCRIPTION

Figure 1:
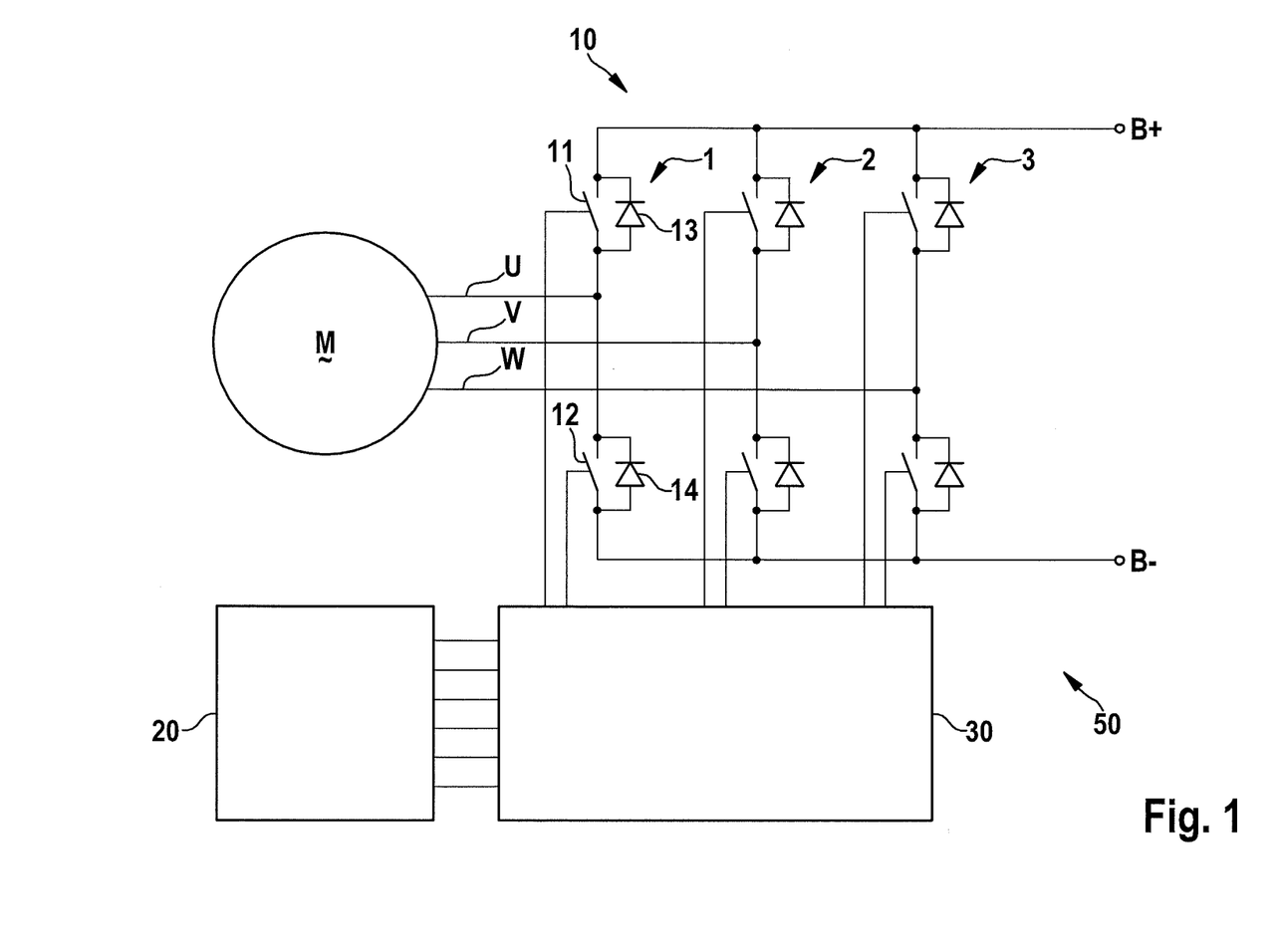
FIG. 1 shows a system having a power converter in which the method according to the present invention can be realized, in a schematic representation.

In the Figures, identical elements, or elements having identical functions, have identical reference characters, and for the sake of clarity are not repeatedly explained. FIG. 1 shows a system, for example a motor vehicle generator, having an electric machine M and a power converter 10, and designated 50 as a whole. A circuit 20 for producing control signals, e.g. a driver controlling, and a corresponding control device 30, e.g. a gate driver, are shown as further components of system 50. Circuit 20 forms, together with control device 30, for example a power converter control unit that can be fashioned according to the present invention. Electric machine M is preferably operated as a motor, the power converter being operated as an inverter. However, the electric machine can also be operated as a generator, power converter 10 then being operated as a rectifier.

An electric machine M fashioned as a generator supplies alternating voltage signals via alternating voltage terminals U, V, W (so-called phase terminals). Alternating voltage terminals U, V, W are connected to power converter half-bridges 1, 2, 3. In the depicted system 50, electric machine M has a three-phase construction, so that three alternating voltage terminals U, V, W are present. Given a larger number of phases, correspondingly more alternating voltage terminals are provided.

In the following, only power converter half-bridge 1 is explained; however, the further power converter half-bridges 2 and 3 have a corresponding design and operate in the same manner. The explanations below relating to FIGS. 2 through 6 therefore relate to all power converter half-bridges 1, 2, 3.

Power converter half-bridge 1 has two controllable switching elements 11 and 12 that can connect an alternating voltage terminal U to a first direct voltage terminal B+, e.g. a positive battery pole, on the one hand, and to a second direct voltage terminal B−, e.g. a negative battery pole or ground, on the other hand. The controlling of controllable switching elements 11 or 12 takes place via signals of control device 30. Parallel to controllable switching elements 11 and 12, freewheeling diodes 13 and 14 are connected. A blocking direction of the diodes here corresponds to a technical direction of current between first direct voltage terminal B+ and second direct voltage terminal B−. Controllable switching elements 12 and 13 can, together with associated freewheeling diodes 13 and 14, each be fashioned as MOSFETs, freewheeling diodes 13 and 14 being fashioned in the form of the respective inverse diodes.

Figure 2:
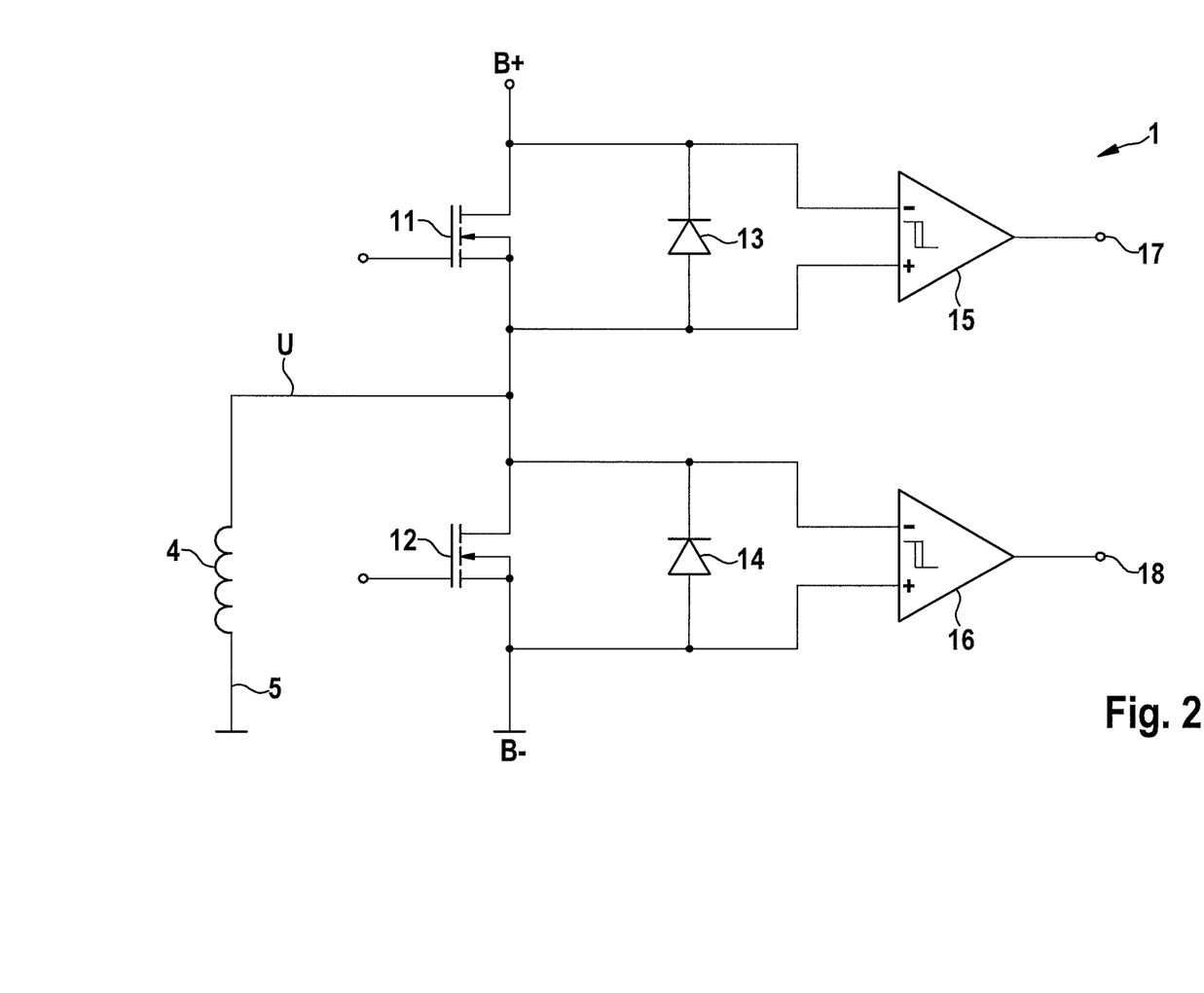
FIG. 2 shows a power converter half-bridge according to a particular preferred specific embodiment of the present invention, in a schematic representation.

FIG. 2 shows a power converter half-bridge 1, for example that of FIG. 1, in a detailed view in the form of a schematic switching diagram. Switching elements 11 and 12 can be fashioned, with associated freewheeling diodes 13 and 14, as transistors, for example as MOSFETs as explained. Comparators 14 and 15 are allocated respectively to switching elements 11 and 12 and to freewheeling diodes 13 and 14. These comparators can be fashioned for example with a boundary voltage of 0.35 V.

Preferred comparators have an operational amplifier between whose inverting and non-inverting inputs the freewheeling diode is connected. Comparators 14 and 15 with hysteresis (e.g. so-called Schmitt trigger), having a hysteresis voltage of e.g. 0.1 V, can be used. In this case, starting from an input voltage to switching elements 11 and 12, or to diodes 13 and 14, of 0.45 V, the comparators output a comparator signal in the form of a logical one, or a voltage signal of e.g. 1 volt, at an output 16 or 17. This is outputted until the voltage again falls below 0.25 V. An inductive load, e.g. a stator winding, is designated 4. Inductive load 4 is connected to a terminal 5. This can be a ground terminal, or also the previously explained terminal B−.

If a corresponding inductive load 4 is fashioned for example as a stator winding of an electric machine M, then in inversion operation of power converter 10 an alternating voltage can be applied to the stator winding (so-called phase) U, V, or W, in order to operate electric machine M as a motor.

Figure 3:
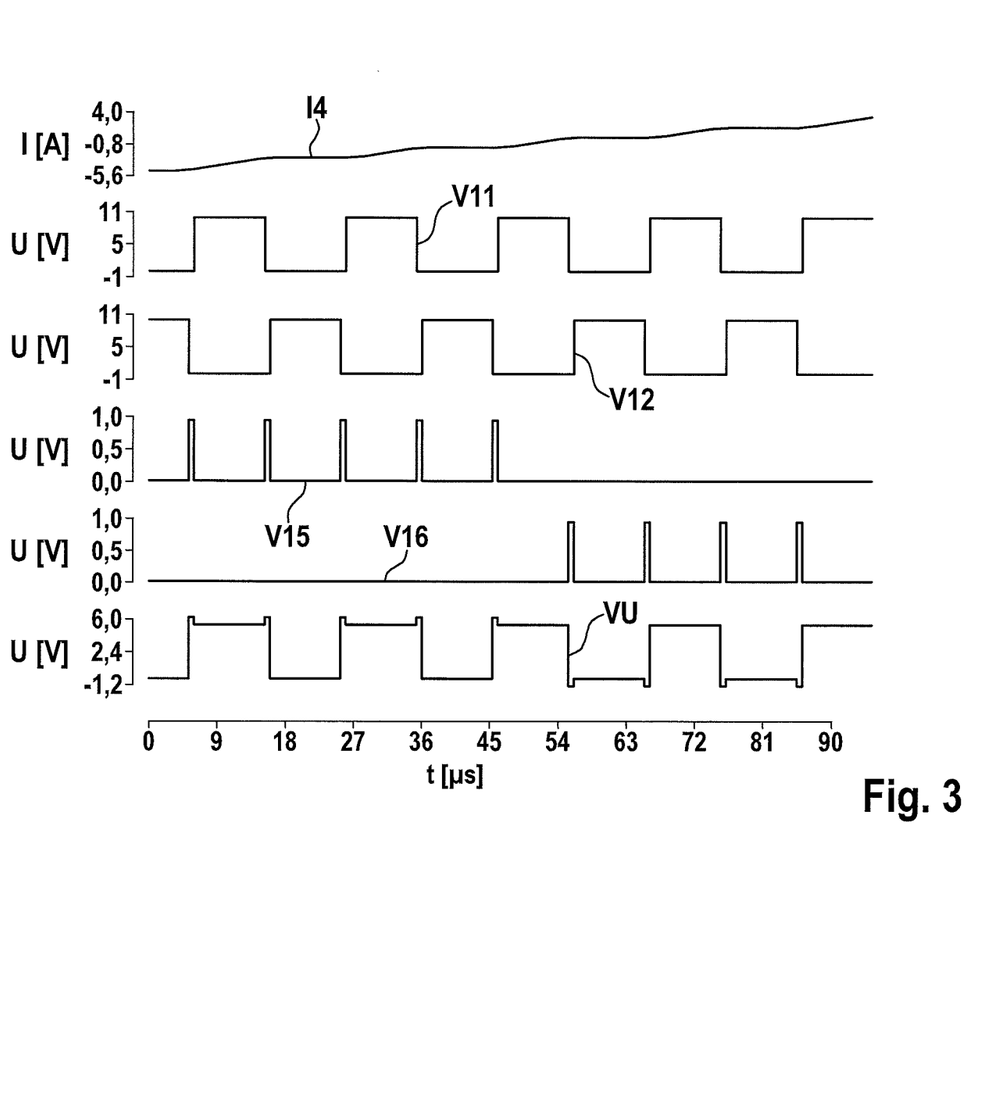
FIG. 3 shows current and voltage signals in a system having a power converter with comparators, given a plurality of switching processes in inversion operation.

FIG. 3 shows current and voltage signals at terminals of a power converter half-bridge, e.g. the above-explained power converter half-bridge 1, with corresponding comparators 15 and 16, during a plurality of switching processes in inversion operation. In each case, current or voltage curves, in A or V, are plotted on the ordinate over time in μs, plotted on the abscissa. FIG. 3 shows a plurality of switching processes of controllable switching elements, for example controllable switching elements 11 and 12 of the previous Figures, over a period of time of 90 μs in inversion operation. Here, a direct voltage present at terminals B+ and B−, supplied here by a battery of the motor vehicle, is converted, through pulse-width modulation operation of the power converter, into an alternating voltage at terminals U, V, W, in order to operate the electric machine as a motor. In this way, the internal combustion engine can be started or can be supported during driving operation (e.g. boost operation). Here, the present invention deploys particular advantages, because in motoric operation very high currents can occur that would cause high power losses or high short-circuit currents.

A flow of current through an inductive load, such as inductive load 4 of FIG. 2, is designated 14. Negative values for the current strength designate a flow of current from terminal 5 via inductive load 5 to alternating voltage terminal U, i.e. a positive half-wave of a corresponding voltage signal. Positive values for the current strength designate a current flow from alternating voltage terminal U via inductive load 5 to terminal 5, i.e. a negative half-wave. In the first case, a current is intended to flow from alternating voltage terminal U to terminal B+, and in the second case from terminal B− to alternating voltage terminal U.

V11 and V12 respectively represent control signals for controllable switching elements situated in a power converter half-bridge, e.g. switching elements 11 and 12. The gate terminal of a previously explained MOSFET is supplied with a corresponding voltage signal, for example 10V, and is thus switched conductive. Control signals V11 and V12 are for example defined by a circuit 20 (explained above) for producing control signals, e.g. a driver controlling, and a corresponding control device 30. As can be seen from FIG. 3, the switched-on phases of the switching elements are in each case made shorter than the switched-off phases. At the same time, the control signal curves are offset temporally relative to one another, so that phases always result in which none of the corresponding switching elements 11 and 12 are controlled and therefore conductive. These are the dead times mentioned above.

During the dead times, there is a flow of current through the freewheeling diodes allocated to the switching elements, e.g. freewheeling diodes 13 and 14, as explained above. Such a current flow can be detected via a corresponding voltage drop at freewheeling diodes 13 and 14, for example via comparators such as comparators 15 and 16.

A comparator signal of a first comparator, e.g. comparator 15, is designated V15, and a comparator signal of a second comparator, e.g. comparator 16, is designated V16. As explained, a current flow takes place in each case corresponding to the polarity of the voltage present at alternating voltage terminal U, so that a current respectively flows either through freewheeling diode 13 or through freewheeling diode 14.

According to the present invention, a respective switching element 11 or 12 of a power converter half-bridge 1 (a situated controllable switching element) is not switched conductive until a corresponding current flow is detected by a comparator 15 and 16 at one of the freewheeling diodes 13 and 14 allocated to switching elements 11 and 12. This avoids "hot paths."

By determining in which of freewheeling diodes 13 and 14 a current flow is taking place, the direction of a corresponding current can be detected even without a dedicated phase current evaluation.

VU indicates the phase voltages at alternating voltage terminal U. As can be seen, in each case shortly before a switching process there is a brief change in voltage; depending on the current direction, this is an increase or a decrease.

Figure 4:
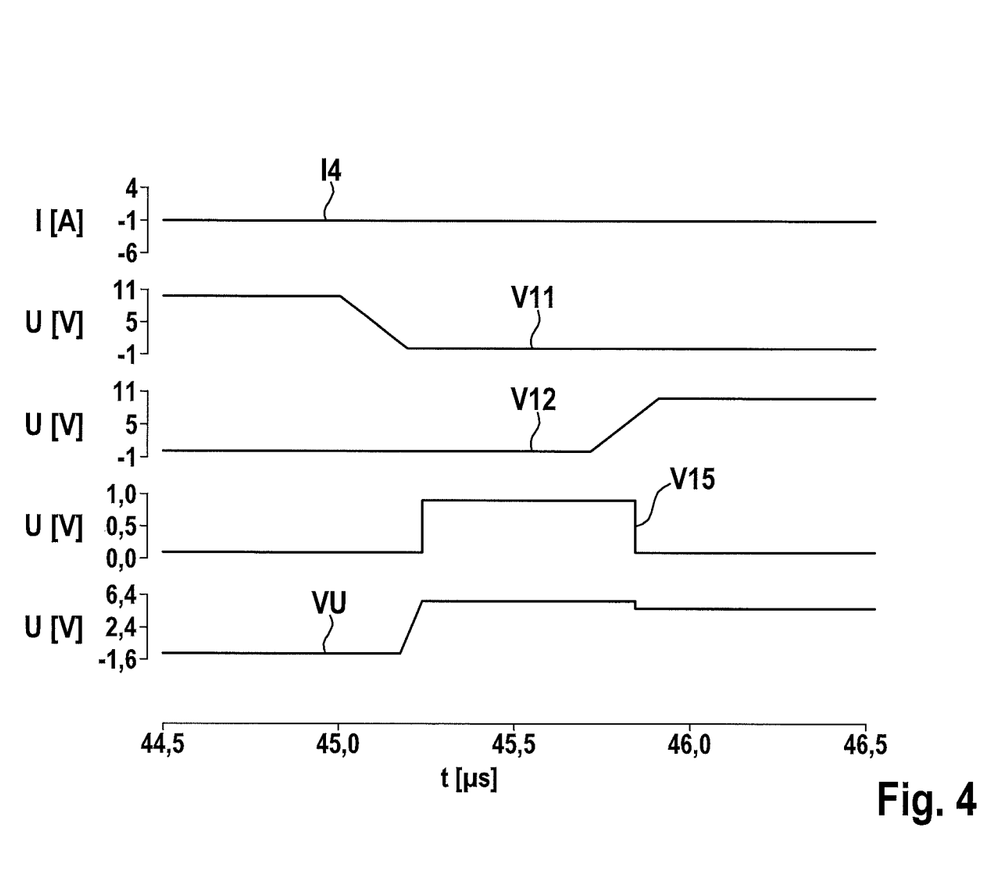
FIG. 4 shows current and voltage signals in a system having a power converter with comparators, given one switching process in inversion operation.

FIG. 4 shows the current and voltage signals at the terminals of the power converter half-bridge, e.g. of the previously explained power converter half-bridge 1, and of corresponding comparators 15 and 16, as shown in FIG. 3, but for the case of only one switching process. The representation shows a period of time from 44.5 to 46 μs in detail.

As can be seen, a control signal V11 is first switched off, while current value 14 is still slightly negative. This causes a flow of current in the corresponding diode, e.g. diode 13. The comparator, e.g. comparator 15, therefore outputs a comparator signal V15 with a certain delay. A corresponding comparator signal V16 is not shown for clarity, because comparator 16 does not respond.

Only after it is indicated, through comparator signal V16, that corresponding switching elements 11 or 12 are closed is a further control signal V12 outputted. VU gives a renewed indication of the phase voltages at alternating voltage terminal U.

Figure 5:
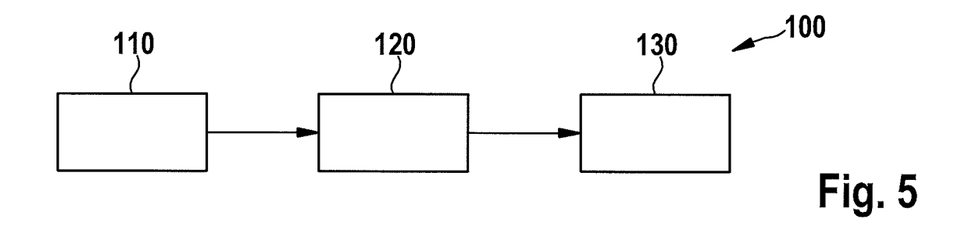
FIG. 5 shows a method according to a particularly preferred specific embodiment of the present invention, in the form of a flow diagram.
Figure 6:
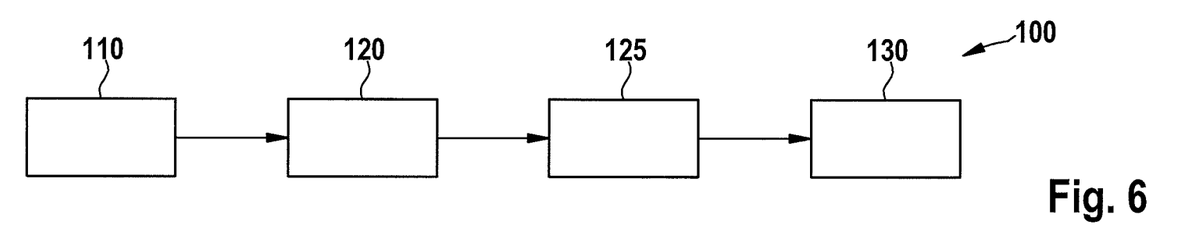
FIG. 6 shows a method according to a particularly preferred specific embodiment of the present invention, in the form of a flow diagram.

FIGS. 5 and 6 show method 100 according to a particularly preferred specific embodiment of the present invention. In a first step 110, a switching element, e.g. switching element 11 or 12, is switched off in each case. In a step 120, a signal of a comparator, e.g. comparator 15 or 16, is waited for. After that, in a step 130 the respective other switching element, e.g. switching element 11 or 12, can be controlled.

An additional step 125 can be provided, as is shown in FIG. 6, in which waiting first takes place for a further time period. In this way, an additional safety buffer can be provided.

What is claimed is:

1. A method for operating a power converter including at least one power converter half-bridge, in which controllable switching elements and freewheeling diodes connected parallel thereto and in a blocking direction are provided respectively between a first direct voltage terminal and an alternating voltage terminal, as well as between the alternating voltage terminal and a second direct voltage terminal, the method comprising:
controlling the switching elements of the at least one half-bridge in alternating fashion and in each case interrupted by controlling pauses; and
setting a duration of the controlling pauses on the basis of a determined voltage drop at at least one of the freewheeling diodes;
wherein the method further comprises determining the voltage drop at the at least one of the freewheeling diodes, and wherein the duration of the controlling pauses is set based on the determined voltage drop exceeding a threshold value.

2. The method as recited in claim 1, further comprising:
operating the power converter in an inversion operating mode, in which a direct voltage present at the first and second direct voltage terminals is converted into an alternating voltage.

3. The method as recited in claim 2, further comprising:
applying the alternating voltage to an inductive load.

4. The method as recited in claim 3, wherein the inductive load includes a stator winding of an electric machine.

5. The method as recited in claim 1, further comprising:
determining the voltage drop at the at least one freewheeling diode by a comparator.

6. The method as recited in claim 5, wherein the comparator has hysteresis.

7. The method as recited in claim 1, wherein the duration of the controlling pauses is set in that when none of the switching elements is controlled, a waiting first takes place until a voltage drop is determined at the at least one freewheeling diode, and only then is a control signal outputted to one of the switching elements.

8. The method as recited in claim 1, wherein the duration of the controlling pauses is additionally set on the basis of at least one of a predetermined time period and a calculated time period.

9. The method as recited in claim 1, further comprising:
determining a direction of a current at the alternating voltage terminal by determining at which of the freewheeling diodes a voltage is dropped.

10. A power converter control unit for controlling a plurality of controllable switching elements in at least one power converter half-bridge of a power converter using control signals, and for setting controlling pauses between the control signals, the power converter control unit comprising:
an arrangement for controlling the switching elements of the at least one half-bridge in alternating fashion and in each case interrupted by the controlling pauses; and
an arrangement for setting a duration of the controlling pauses on the basis of a determined voltage drop at at least one freewheeling diode;
wherein the method further comprises determining the voltage drop at the at least one of the freewheeling diodes, and wherein the duration of the controlling pauses is set based on the determined voltage drop exceeding a threshold value.

11. A power converter system comprising:
a power converter including at least one power converter half-bridge in which controllable switching elements and freewheeling diodes connected parallel thereto and in a blocking direction are provided respectively between a first direct voltage terminal and an alternating voltage terminal, as well as between the alternating voltage terminal and a second direct voltage terminal; and
a power converter control unit including:
an arrangement for controlling the switching elements of the at least one half-bridge in alternating fashion and in each case interrupted by controlling pauses, and
an arrangement for setting a duration of the controlling pauses on the basis of a determined voltage drop at at least one of the freewheeling diodes;
wherein the method further comprises determining the voltage drop at the at least one of the freewheeling diodes, and wherein the duration of the controlling pauses is set based on the determined voltage drop exceeding a threshold value.

12. The power converter system as recited in claim 11, wherein at least one of the controllable switching elements, together with the freewheeling diodes connected in parallel, includes a MOSFET.

13. A motor vehicle generator, comprising:
an electric machine; and
a power converter system connected to the electric machine, the power converter system including:
a power converter including at least one power converter half-bridge in which controllable switching elements and freewheeling diodes connected parallel thereto and in a blocking direction are provided respectively between a first direct voltage terminal and an alternating voltage terminal, as well as between the alternating voltage terminal and a second direct voltage terminal, and
a power converter control unit including:
an arrangement for controlling the switching elements of the at least one half-bridge in alternating fashion and in each case interrupted by controlling pauses, and
an arrangement for setting a duration of the controlling pauses on the basis of a determined voltage drop at at least one of the freewheeling diodes;
wherein the method further comprises determining the voltage drop at the at least one of the freewheeling diodes, and wherein the duration of the controlling pauses is set based on the determined voltage drop exceeding a threshold value.

14. A non-transitory machine-readable storage medium having a computer program stored thereon that has a program code that causes a power converter control unit to carry out a method for operating a power converter including at least one power converter half-bridge, in which controllable switching elements and freewheeling diodes connected parallel thereto and in a blocking direction are provided respectively between a first direct voltage terminal and an alternating voltage terminal, as well as between the alternating voltage terminal and a second direct voltage terminal, the method comprising:
- controlling the switching elements of the at least one half-bridge in alternating fashion and in each case interrupted by controlling pauses; and
- setting a duration of the controlling pauses on the basis of a determined voltage drop at at least one of the freewheeling diodes;
- wherein the method further comprises determining the voltage drop at the at least one of the freewheeling diodes, and wherein the duration of the controlling pauses is set based on the determined voltage drop exceeding a threshold value.

* * * * *